(12) United States Patent
Kakio et al.

(10) Patent No.: US 11,561,743 B2
(45) Date of Patent: Jan. 24, 2023

(54) PRINT CONTROL SERVER AND PRINT CONTROL METHOD FOR CHAT SYSTEM ADMINISTRATION

(71) Applicant: SEIKO EPSON CORPORATION, Tokyo (JP)

(72) Inventors: Ryosuke Kakio, Matsumoto (JP); Takashi Sera, Shiojiri (JP); Yosuke Kawakami, Matsumoto (JP); Yuma Kitahara, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/448,071

(22) Filed: Sep. 20, 2021

(65) Prior Publication Data
US 2022/0091794 A1 Mar. 24, 2022

(30) Foreign Application Priority Data

Sep. 23, 2020 (JP) .............................. JP2020-158305

(51) Int. Cl.
*G06F 3/12* (2006.01)

(52) U.S. Cl.
CPC .......... *G06F 3/1206* (2013.01); *G06F 3/1273* (2013.01); *G06F 3/1288* (2013.01)

(58) Field of Classification Search
None
See application file for complete search history.

(56) References Cited

U.S. PATENT DOCUMENTS

| 6,864,992 | B1 * | 3/2005 | Okada | G06F 11/3485 358/1.15 |
| 9,367,776 | B2 * | 6/2016 | Ulichney | G06F 21/608 |
| 9,977,638 | B2 * | 5/2018 | Tachi | G06F 3/1273 |
| 11,132,154 | B2 * | 9/2021 | Tomihisa | G06F 3/1204 |
| 11,237,779 | B2 * | 2/2022 | Oikawa | G06F 3/1204 |
| 2010/0100942 | A1 * | 4/2010 | Wassong | H04L 67/148 726/4 |
| 2011/0154479 | A1 * | 6/2011 | Terabe | H04N 1/4413 726/16 |
| 2013/0091443 | A1 * | 4/2013 | Park | G06Q 10/107 715/758 |
| 2015/0172505 | A1 * | 6/2015 | Park | H04N 1/00307 358/1.15 |
| 2018/0032297 | A1 * | 2/2018 | She | G06F 3/1238 |
| 2018/0174222 | A1 * | 6/2018 | Venkatakrishnan | H04L 51/02 |
| 2018/0227251 | A1 * | 8/2018 | Takishima | G06F 3/1225 |
| 2018/0276202 | A1 * | 9/2018 | Baek | G06F 40/263 |
| 2019/0258431 | A1 * | 8/2019 | Yamamoto | G06F 3/1268 |
| 2019/0317709 | A1 * | 10/2019 | Sugimoto | G06F 3/1204 |
| 2019/0369924 | A1 * | 12/2019 | Oka | H04L 51/02 |

(Continued)

FOREIGN PATENT DOCUMENTS

JP 2020-071598 A 5/2020

*Primary Examiner* — Ted W Barnes
(74) *Attorney, Agent, or Firm* — Workman Nydegger

(57) ABSTRACT

A print control server includes a print controller that acquires a print instruction entered by a user belonging to a group chat in a chat system provided by a social networking service (SNS) and causes a printer to execute printing in accordance with the print instruction, a history acquirer that acquires a print history, based on the print instruction, of the printer, and a notifier that notifies the print history in a chat form to an administrator of the group chat via the chat system.

11 Claims, 6 Drawing Sheets

(56) References Cited

U.S. PATENT DOCUMENTS

| | | | |
|---|---|---|---|
| 2020/0099642 A1* | 3/2020 | Mishima | G06F 3/1285 |
| 2020/0133592 A1* | 4/2020 | Mitsuhashi | G06F 3/1226 |
| 2021/0165616 A1* | 6/2021 | Yasuda | G06F 3/1238 |
| 2022/0035590 A1* | 2/2022 | Nakamori | G06F 3/1205 |

* cited by examiner

FIG. 2

| USER IDENTIFICATION INFORMATION | PRINTER IDENTIFICATION INFORMATION ||
|---|---|---|
| U1****** | abcd@print.··· | efgh@print.··· |
| U2****** | abcd@print.··· | efgh@print.··· |
| U3****** | abcd@print.··· | |
| ······ | abcd@print.··· | |

55

PRINT CONTROL SERVER AND PRINT CONTROL METHOD FOR CHAT SYSTEM ADMINISTRATION

The present application is based on, and claims priority from JP Application Serial Number 2020-158305, filed Sep. 23, 2020, the disclosure of which is hereby incorporated by reference herein in its entirety.

BACKGROUND

1. Technical Field

The present disclosure relates to a print control server and a print control method.

2. Related Art

A user who uses a social networking service (hereinafter referred to as SNS) can post a file such as a text or a picture to a chat system provided by the SNS and publish the file to another user who participates in the same group chat. In addition, the user can use a printing system coupled to the SNS via a network to print the file posted to the SNS with a printer registered in the printing system in advance.

In addition, the following information processing device has been disclosed (refer to JP-A-2020-71598). That is, when a print instruction is posted to a chat room by a user whose printer is not registered, a message requesting the printer to be registered is posted to the chat room, and the user posts the printer ID to the chat room in response to the posting of the message, the information processing device associates the printer ID with the user, registers the printer ID and the user, and executes printing using the registered printer.

In existing techniques, an administrator of a group chat cannot recognize a state of printing performed by each of users who are members of the group chat. Therefore, it is difficult for the administrator to appropriately manage printing via a chat system.

SUMMARY

A print control server includes a print controller that acquires a print instruction entered by a user belonging to a group chat in a chat system provided by an SNS and causes a printer to execute printing in accordance with the print instruction, a history acquirer that acquires a print history, based on the print instruction, of the printer, and a notifier that notifies the print history in a chat form to an administrator of the group chat via the chat system.

A print control method includes a print control process of acquiring a print instruction entered by a user belonging to a group chat in a chat system provided by an SNS and of causing a printer to execute printing in accordance with the print instruction, a history acquisition process of acquiring a print history, based on the print instruction, of the printer, and a notification process of notifying the print history in a chat form to an administrator of the group chat via the chat system.

BRIEF DESCRIPTION OF THE DRAWINGS

FIG. 2 is a diagram illustrating a user DB.

DESCRIPTION OF EXEMPLARY EMBODIMENTS

Hereinafter, an embodiment of the present disclosure is described with reference to the drawings. The drawings merely illustrate examples to explain the embodiment. Since the drawings illustrate the examples, ratios and shapes may not be correct and may not be consistent with each other and a portion may be omitted.

1. System Configuration

Figure 1:
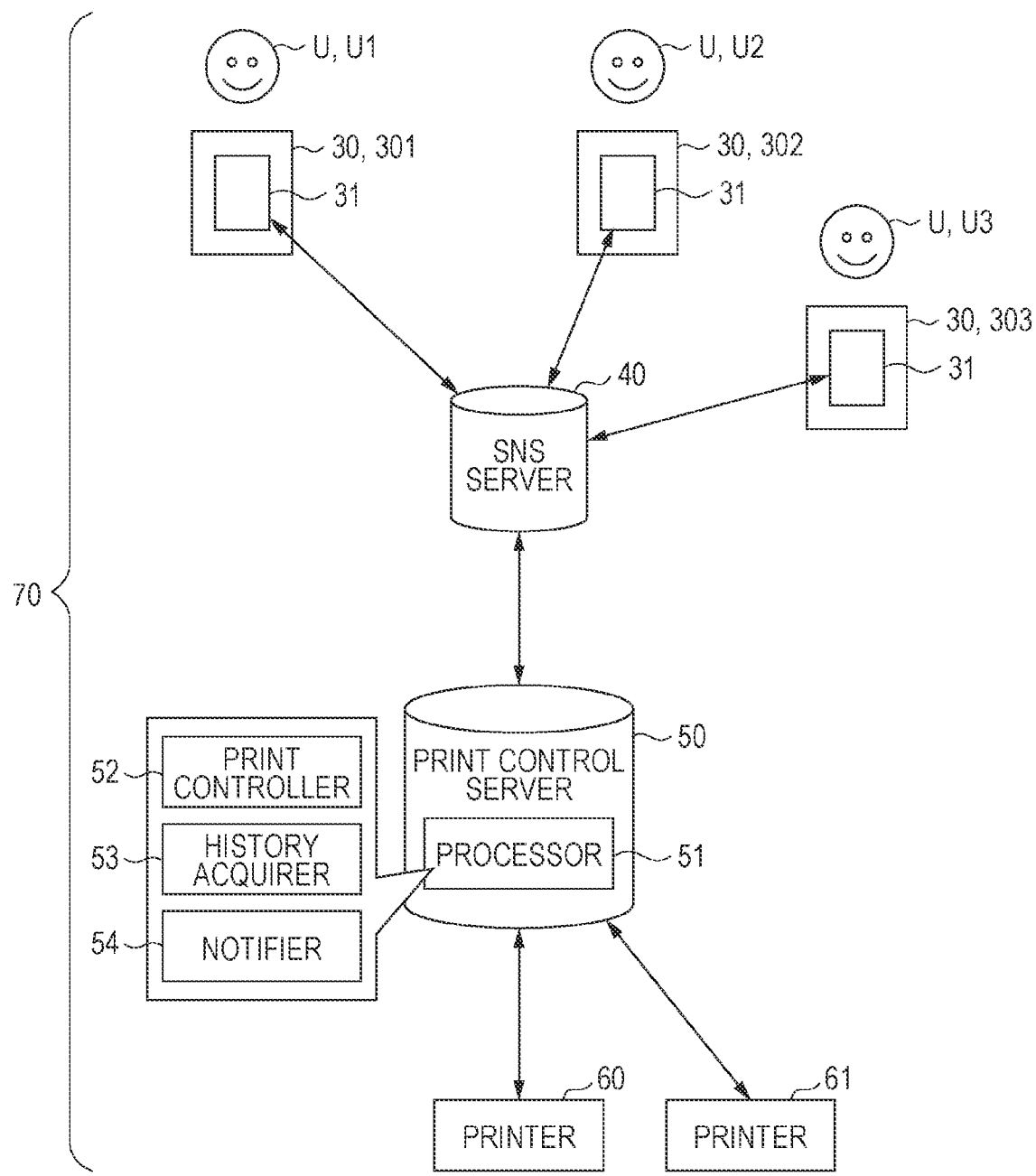
FIG. 1 is a schematic block diagram illustrating a system.

FIG. 1 is a schematic block diagram illustrating a configuration of a system 70 according to an embodiment. At least a part of the system 70 may be referred to as printing system. As illustrated in FIG. 1, the system 70 includes a plurality of terminal devices 30, a plurality of servers 40 and 50, and a printer 60. The terminal devices 30, the servers 40 and 50, and the printer 60 are coupled to and able to communicate with each other via the Internet when necessary, as illustrated in FIG. 1.

Figure 3:
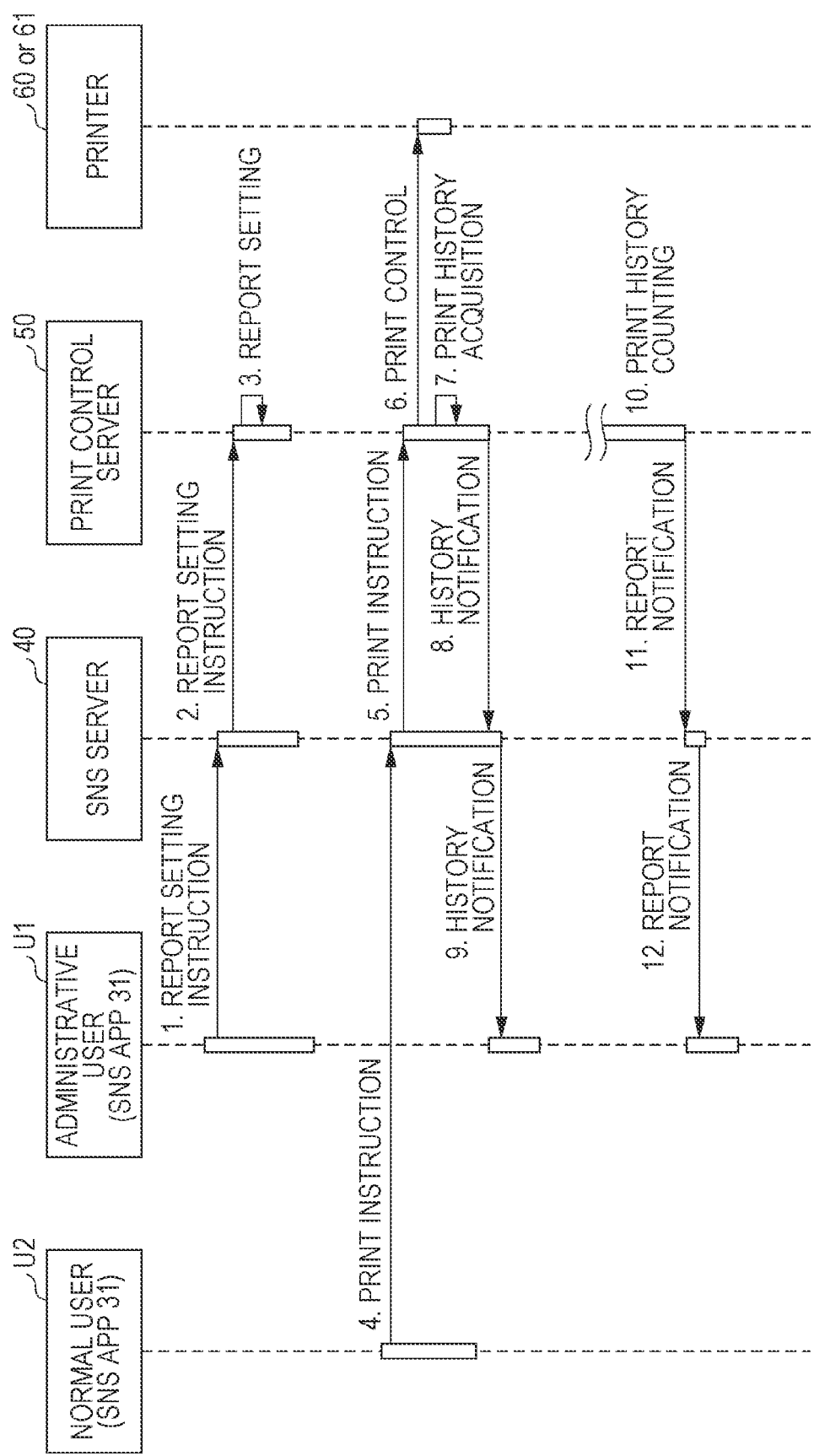
FIG. 3 is a sequence diagram illustrating a print control process.

The terminal devices 30 are communication devices that are operated by users U. The terminal devices 30 are, for example, smartphones, tablet terminals, personal computers (PCs), or the like. Some applications are installed in each of the terminal devices 30. In the example illustrated in FIG. 1, as an example of an application, an SNS application 31 for use of a certain SNS is installed in each of the terminal devices 30. The certain SNS is hereinafter merely referred to as SNS. In FIG. 3, the SNS application 31 is abbreviated as SNS APP 31.

That is, the users U are users of the SNS. Each of the users U has their own account for the SNS in advance. The accounts are identification information identifying the users in the SNS and include user IDs, passwords, and other personal information. FIG. 1 illustrates terminal devices 301, 302, 303, . . . as the terminal devices 30 in order to distinguish the terminal devices 30 for convenience. FIG. 1 also illustrates users U1, U2, U3, . . . as the users U who use the terminal devices 301, 302, 303, . . . in order to distinguish the users U. The users U use the SNS by logging in to the SNS application 31 activated in the terminal devices 30 using the users' accounts.

The SNS server 40 is one or multiple servers for providing the SNS on the Internet. The SNS server 40 and the SNS application 31 collaborate with each other, thereby providing the SNS to the users having the accounts. In the embodiment, the SNS server 40 provides a chat system as one of services to the users U. Each of the users U can participate in a certain group chat in the chat system and chat with the other users belonging to the common group chat. The group chat may be referred to as channel or work space.

The print control server 50 can control printing via the SNS. The print control server 50 is one or multiple servers that can cause a specified printer to execute printing, based on an entry of a print instruction by a user U in the chat system. The print control server 50 enables a print control method. The SNS application 31 communicates information necessary for printing with the print control server 50 via an application programming interface (API) provided by the SNS server 40. A processor 51 that controls the print control server 50 functions as a print controller 52, a history acquirer 53, a notifier 54, and the like.

FIG. 1 illustrates a printer 61 as well as the printer 60. Specifically, a plurality of printers that can be used by the print control server 50 via the Internet may be present.

A user U can activate the SNS application 31 and operate a terminal device 30 to perform an entry process in accordance with a predetermined rule for the chat system provided by the SNS server 40 and create a group chat in the chat system. The user U who has created the group chat is hereinafter referred to as "administrative user" in the sense that the user manages the group chat. Alternatively, the administrator of the group chat may be a user U with a privilege as an administrator. In the following description, it is assumed that the user U1 is the administrative user.

The administrative user U1 can invite the other users U to the group chat in accordance with a predetermined rule for the chat system and register the other users U as members. In this example, the users U who are registered for the group chat and are not the administrative user U1 are referred to as "normal users". In the following description, it is assumed that the users U2 and U3 are normal users.

FIG. 2 illustrates an example of a user database 55 in which users U registered for a certain group chat are defined. The word "database" is abbreviated to DB. In the user DB 55, identification information of each of the users U belonging to the certain group chat is defined. In this case, identification information "U1****" corresponds to the administrative user U1, identification information "U2**" corresponds to the normal user U2, and identification information "U3****" corresponds to the normal user U3. For example, the user DB 55 is generated based on an entry by the administrative user U1 in the chat system via the terminal device 301. The generated user DB 55 is transmitted to the print control server 50 via the SNS server 40 and stored in the print control server 50.

As illustrated in FIG. 2, the user DB 55 also includes printer identification information for each of the users U. The printer identification information is identification information specific to each of the printers recognized by the print control server 50 via a network. For example, the printer identification information is email addresses, printer names, serial numbers, or the like that are assigned to the printers. For example, common printer identification information is associated with each of the users U belonging to the same group chat. Different printers may be associated with each of the users U. As illustrated for some users U in FIG. 2, a plurality of printers may be associated with each of the users U.

In the example illustrated in FIG. 2, printer identification information "abcd@print . . ." identifies the printer 60 and printer identification information "efgh@print . . ." identifies the printer 61. When the administrative user U1 creates the group chat in the chat system and arbitrarily specifies the printers 60 and 61, the users U are associated with the printers 60 and 61. Specifically, the print control server 50 acquires, via the SNS server 40, association relationships between the users U and the printers that have been specified by the administrative user U1, associates the identification information of the printers with the user DB 55, registers the identification information in association with the user DB 55.

2. Printing and History Notification

Next, a print control process according to the embodiment is described on the assumption that the user DB 55 is already stored in the print control server 50.

FIG. 3 is a sequence diagram illustrating processes by the configurations relating to the print control process and included in the system 70. In FIG. 3, a process by the normal user U2 is a process that is executed by the normal user U2 operating the terminal device 302 with the SNS application 31 activated therein and using the account of the normal user U2. In FIG. 3, a process by the administrative user U1 is a process that is executed by the administrative user U1 operating the terminal device 301 with the SNS application 31 activated therein and using the account of the administrative user U1.

The administrative user U1 enters a report setting instruction in the chat system in "1. report setting instruction". Specifically, the report setting instruction is posted by the administrative user U1 to the chat system and received by the SNS server 40. In the embodiment, a "report" indicates a print history counted for a predetermined time period. The report setting instruction is an instruction to set the length of the predetermined time period for counting the print history for one report, the time to notify the report, and the like. The administrative user U1 can arbitrarily determine the length of the predetermined time period and the time to notify the report, and post the determined length and the determined time as the report setting instruction.

Next, as understood from a description of "2. report setting instruction", the report setting instruction received by the SNS server 40 is transmitted from the SNS server 40 to the print control server 50. The SNS server 40 transmits, to the print control server 50, the report setting instruction received from the administrative user U1 and having added thereto information identifying the group chat to which the administrative user U1 who has entered the report setting instruction belongs.

When the print control server 50 receives the report setting instruction via the SNS server 40, the history acquirer 53 executes "3. report setting". Specifically, the history acquirer 53 sets and stores, in accordance with the received report setting instruction, the length of the predetermined time period relating to the group chat identified from the information added to the received report setting instruction and the time, relating to the group chat, to notify the report.

For example, the history acquirer 53 sets, to one month, the predetermined time period relating to the group chat to which the administrative user U1 belongs, in accordance with the report setting instruction transmitted from the administrative user U1. In addition, for example, the history acquirer 53 sets the time, relating to the group chat, to notify the report to the last day within the predetermined time period in accordance with the report setting instruction transmitted from the administrative user U1.

Alternatively, for example, the history acquirer 53 sets, to one month, the predetermined time period relating to the group chat to which the administrative user U1 belongs, in accordance with the report setting instruction transmitted from the administrative user U1. In addition, for example, the history acquirer 53 sets the time to notify the report to a predetermined date and time in the next month in accordance with the report setting instruction transmitted from the administrative user U1.

After "3. report setting", the history acquirer 53 repeatedly executes an operation ("10. print history counting) of counting a print history for the set predetermined time period, which is a unit time period, for printing based on a print instruction from each of users U belonging to the group chat for which the report setting has been configured.

Next, processes indicated by numbers 4 to 9 in FIG. 3 are described. The processes indicated by the numbers 4 to 9 are basically executed for each execution of printing.

The normal user U2 enters a print instruction for any file in the group chat to which the normal user U2 belongs in the chat system in "4. print instruction". Specifically, the print instruction is posted by the normal user U2 to the chat system and received by the SNS server 40.

As understood from a description of "5. print instruction", the print instruction received by the SNS server 40 is transmitted from the SNS server 40 to the print control server 50. The SNS server 40 transmits, to the print control server 50, the print instruction received from the user U and having added thereto identification information of the user U who has entered the print instruction. The print instruction includes data of the file specified as a print target in the print instruction. The print instruction also includes information arbitrarily entered by the user who has entered the print instruction. For example, the print instruction includes information specifying the number of copies to be printed for the file, the number of sheets to be printed for the file, and the like.

When the print control server 50 receives the print instruction via the SNS server 40, the print controller 52 executes "6. print control". the print controller 52 references the user DB 55 to identify, from printer identification information, a printer associated with the normal user U2 who has entered the print instruction. Then, the print controller 52 causes the identified printer to execute printing on the file in accordance with the print instruction.

When identification information of a plurality of printers associated with the user U who has entered the print instruction is defined in the user DB 55, the print controller 52 may cause one of the printers, for example, the printer 60 to execute printing. In addition, when the print instruction includes information specifying a printer to be used, the print controller 52 may cause the printer specified in the print instruction to execute printing.

The history acquirer 53 executes "7. print history acquisition" to acquire a print history based on the print instruction upon receiving a result of executing "6. print control" based on the print instruction. A print history is information on printing executed in accordance with one print instruction. For example, the print history is information indicating the number of sheets printed, the file targeted for the printing, the printer that has executed the printing, the user U who has entered the print instruction, and the like. The print history may include the foregoing information and various information, such as a date and time when the printing is executed, and information indicating whether the printing is color printing or monochrome printing. For example, it is assumed that the normal user U2 posts, to the group chat, a print instruction indicating that two copies of a first text file of 10 pages in total are to be printed by the printer 60. In this case, after "6. print control" executed in accordance with the print instruction, the history acquirer 53 generates a print history including information indicating that the number of sheets printed=20, a file name=the first text file, a printer="abcd@print . . . ", and a user U="U2******".

Subsequently, the notifier 54 executes "8. history notification". Specifically, the notifier 54 notifies, in a chat form, the print history acquired in "7. print history acquisition" via the chat system to the administrative user of the group chat to which the user U who has entered the print instruction belongs. It is assumed that, in the user DB 55 associated with the group chat, predetermined information indicating an administrator is added to identification information corresponding to the administrative user U1 among identification information of the users U. Therefore, the notifier 54 can reference the user DB 55 to identify the administrative user of the group chat to which the user U who has entered the print instruction belongs. As indicated by "8. history notification" and "9. history notification" in FIG. 3, a history notification is transmitted from the print control server 50 to the SNS server 40 and transmitted from the SNS server 40 to the administrative user U1.

The SNS server 40 recognizes an administrative user for each group chat. Therefore, when the notifier 54 of the print control server 50 transmits the history notification to the SNS server 40 in "8. history notification", the notifier 54 may not identify the administrative user of the group chat to which the user U who has entered the print instruction belongs, and may request the SNS server 40 to identify the administrative user and execute "9. history notification".

Figure 4:
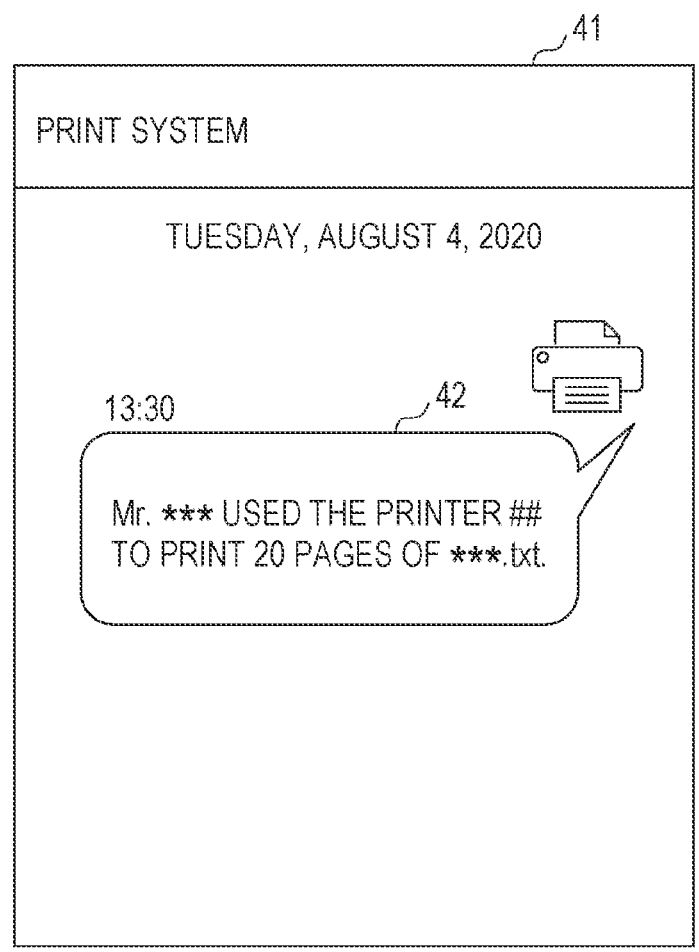
FIG. 4 is a diagram illustrating an example of a chat screen on which a history notification is displayed.

FIG. 4 illustrates an example of a chat screen 41 presented by the SNS server 40 to the administrative user U1. The chat screen 41 displays a chat performed by the administrative user 1 and the print control server 50 in the chat system. The administrative user U1 views the chat screen 41 on a display of the terminal device 301. As a result of "8. history notification" and "9. history notification", a message 42 as the history notification is displayed on the chat screen 41. The message 42 indicates a print history indicating details including any of the users U belonging to the group chat, a printer used by the user U, a file printed by the printer, and the number of sheets printed for the file.

FIG. 3 illustrates the case where the normal user U2 performs "4. print instruction". Cases where the normal user U3 and the administrative user U1 perform "4. print instruction" can be interpreted in the same manner as the description of the processes indicated by the numbers 4 to 9 in FIG. 3. Specifically, when any one of the users U belonging to the group chat posts a print instruction to the chat system, and printing is executed in accordance with the print instruction via the SNS server 40 and the print control server 50, a print history relating to the printing is notified to the administrative user of the group chat.

As understood from the above description, the history acquirer 53 counts, for each of the foregoing predetermined time periods relating to a certain group chat, a print history acquired in "7. print history acquisition" for each of users U of the group chat. The time to notify a report is set for the certain group chat. When it is time to notify the report, the notifier 54 executes "11. report notification". Specifically, the notifier 54 notifies, in a chat form, the report on the group chat to the administrative user of the group chat via the chat system. As indicated by "11. report notification" and "12. report notification" in FIG. 3, a report notification is transmitted from the print control server 50 to the SNS server 40 and transmitted from the server 40 to the administrative user U1.

Figure 5:
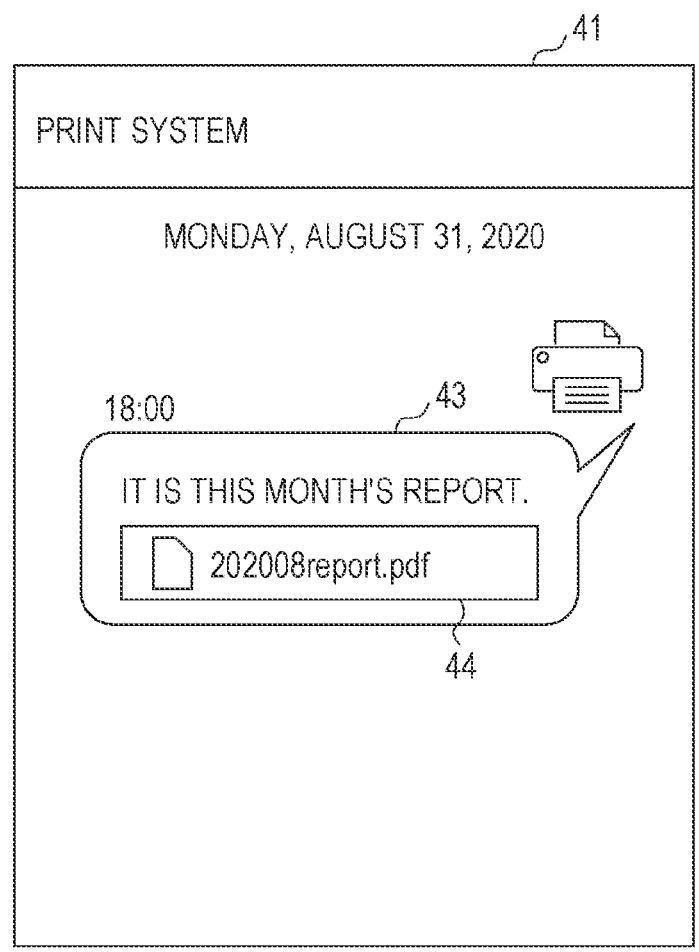
FIG. 5 is a diagram illustrating an example of the chat screen on which a report notification is displayed.

FIG. 5 illustrates another example of the chat screen 41 presented by the SNS server 40 to the administrative user U1. The example illustrated in FIG. 5 is different from the example illustrated in FIG. 4. As a result of "11. report notification" and "12. report notification", a message 43 as a report notification is displayed on the chat screen 41. The message 43 notifies the administrative user U1 of a report obtained by counting a print history for a predetermined time period (for example, August, 2020) on the last day of the predetermined time period. That is, a monthly report is notified to the administrative user U1 in each month. When set time to notify a report is a predetermined date and time in the next month, a report for August in 2020 is notified to the administrative user U1 at a predetermined date and time in September, 2020.

In the example illustrated in FIG. 5, a file 44 of the report is attached to the message 43. The administrative user U1 can tap or click the file 44 on the chat screen 41 to open the file 44 and view a detail of the report. The report is data of a list of print histories for each execution of printing in accordance with a print instruction from each of users U of a group chat within a predetermined time period. Therefore, the amount of information of one report is larger than a print history notified in one execution of "8. history notification".

Therefore, the notifier 54 generates the file of the report in a predetermined format and notifies the file of the report to the administrative user U1. The format of the file 44 is not limited. The file 44 may be compressed in a format that the terminal devices 30 can decompress.

The message 43 may include a Uniform Resource Locator (URL) indicating the location of the file 44 in the print control server 50. The administrative user U1 may tap or click the URL displayed together with the message 43 in the chat screen 41 to download the file 44 from the print control server 50 and view the report. The administrative user U1 can view the report to know a file printed by each user U of the group chat managed by the administrative user U1, a printer used for the printing, and the number of sheets printed for the file within the predetermined time period.

Not only when the notifier 54 receives a request to notify the report at the set time to notify the report but also when the notifier 54 receives a request to notify the report via the chat system, the notifier 54 can notify the report.

Figure 6:
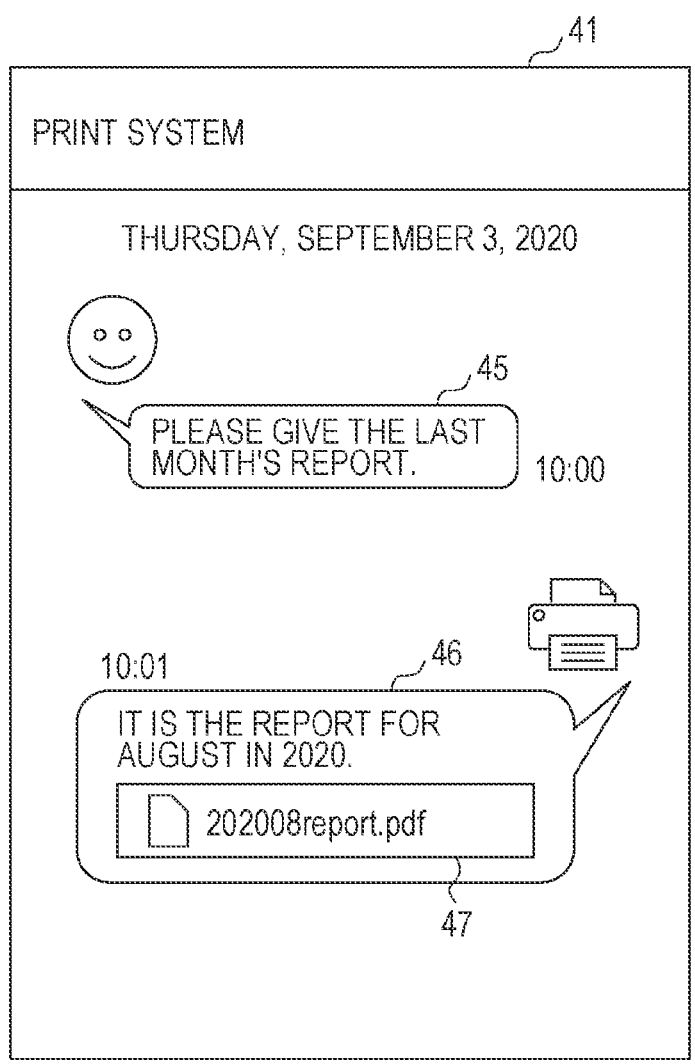
FIG. 6 is a diagram illustrating another example of the chat screen on which a report notification is displayed.

FIG. 6 illustrates another example of the chat screen 41 presented by the SNS server 40 to the administrative user U1. The example illustrated in FIG. 6 is different from the examples illustrated in FIGS. 4 and 5.

The administrative user U1 posts a request to notify a report to the chat system. A message 45 on the chat screen 41 illustrated in FIG. 6 is an example of the request, posted by the administrative user U1, to notify the report. The message 45 is transmitted to the print control server 50 via the SNS server 40.

The notifier 54 receives the message 45 and notifies, via the SNS server 40, the report to the administrative user U1 who has sent the message 45. As a result, a message 46 as a report notification is displayed on the chat screen 41. In the example illustrated in FIG. 6, since the message 45 "Please give the last month's report." is posted by the administrative user U1 in September, 2020 that is one predetermined time period, the notifier 54 returns, to the administrative user U1, the message 46 notifying a report for August that is a predetermined time period immediately before the one predetermined time period. The message 46 has, attached thereto, a file 47 of the report, like the message 43 illustrated in FIG. 5. Therefore, the administrative user U1 can tap or click the file 47 on the chat screen 41 to open the file 47 and view a detail of the report. The message 46 may include a URL indicating the location of the file 47 in the print control server 50, as supplementarily described about the message 43 illustrated in FIG. 5.

3. Conclusion

According to the embodiment, the print control server 50 includes the print controller 52 that acquires a print instruction entered by a user U belonging to a group chat in the chat system provided by the SNS and causes a printer to execute printing in accordance with the print instruction, the history acquirer 53 that acquires a print history, based on the print instruction, of the printer, and the notifier 54 that notifies the print history in a chat form to an administrator of the group chat via the chat system.

According to the configuration, the administrator of the group chat can recognize a history of printing performed by each of users U of the group chat via the chat system. In addition, the administrator can recognize a history of printing performed by each of the users U of the group chat via the chat system to appropriately manage printing via the chat system by prompting each of the users U to suppress printing or the like when, for example, an amount to be printed is larger than expected.

According to the embodiment, the print history may include the number of sheets printed.

According to the configuration, the administrator can recognize the number of sheets printed in accordance with a print instruction.

According to the embodiment, the print history may be information of each of users U who have entered the print instruction.

According to the configuration, the administrator can recognize a user who belongs to the group chat and has entered a print instruction for which printing has been executed.

According to the embodiment, the print history may be information of each of files specified as print targets in the print instruction.

According to the configuration, the administrator can recognize a file printed in accordance with a print instruction.

According to the embodiment, the print history may be information of each of printers that have executed printing in accordance with the print instruction.

According to the configuration, the administrator can recognize a printer that has executed printing in accordance with a print instruction.

According to the embodiment, the history acquirer 53 may count the print history for each of predetermined time periods and the notifier 54 may notify the counted print history (report) to the administrator.

According to the configuration, the administrator can not only recognize a print history for each of print instructions but also collectively recognize a print history for each of the predetermined time periods.

According to the embodiment, the notifier 54 may notify the counted print history to the administrator in each of the predetermined time periods.

According to the configuration, the administrator can acquire, in each month, a report for the corresponding month.

The predetermined time periods are not limited to months and may be, for example, weeks, years, or time periods of a length other than a week, a month, and a year.

According to the embodiment, the notifier 54 may notify the counted print history to the administrator at a specified date and time.

According to the configuration, the administrator can acquire a last month's report at a specified date and time in each month.

According to the embodiment, when the notifier 54 receives, via the chat system, a request to notify the counted print history, the notifier 54 may notify the counted print history to the administrator.

According to the configuration, the administrator can quickly receive the report since the notification request is provided at any time.

In addition, when the notifier 54 receives, via the chat system, an instruction to change the time to notify the counted print history, the notifier 54 may change, in accordance with the change instruction, the time to notify the counted print history to the administrator.

When the notifier 54 receives, via the SNS server 40, an instruction to change the time to notify a report on a certain group chat, the notifier 54 may change, in accordance with the change instruction, the time to notify the report on the group chat. That is, the administrator or a user U other than the administrator can post the change instruction to the chat system, thereby changing the time, set once in "3. report setting" illustrated in FIG. 3, to notify the report.

The embodiment discloses not only the print control server but also techniques in various categories, such as a system, a method, and a program.

According to the above description about the print control server 50, the print control method is disclosed. The print control method includes a print control process of acquiring a print instruction entered by a user U belonging to a group chat in the chat system provided by the SNS and of causing a printer to execute printing in accordance with the print instruction, a history acquisition process of acquiring a print history, based on the print instruction, of the printer, and a notification process of notifying the print history in a chat form to an administrator of the group chat via the chat system.

Some of the instructions illustrated in FIG. 3 and transmitted from the users U to the print control server 50 and the notifications illustrated in FIG. 3 and transmitted from the print control server 50 to the user U may not be achieved via the chat system achieved by causing the SNS application 31 and the SNS server 40 to collaborate with each other and may be achieved by using a browser or a method such as an email between the terminals 30 and the print control server 40.

What is claimed is:

1. A print control server comprising:
   a print controller configured to acquire a print instruction entered by a user belonging to a group chat in a chat system provided by a social networking service (SNS) and configured to cause a printer to execute printing in accordance with the print instruction;
   a history acquirer configured to acquire a print history, based on the print instruction, of the printer; and
   a notifier configured to notify an administer of the group chat about the print instruction entered by the user, the notifier notifying the administrator in a chat form via the chat system at the same time that the user entered the print instruction into the group chat, and notify the administrator of the group chat about the print history in the chat form via the chat system at a time after the notifier has notified the administrator about the print instruction.

2. The print control server according to claim 1, wherein the print history includes the number of sheets printed.

3. The print control server according to claim 1, wherein the print history is information of each of users who have entered the print instruction.

4. The print control server according to claim 1, wherein the print history is information of each of files specified as print targets in the print instruction.

5. The print control server according to claim 1, wherein the print history is information of each of printers that have executed printing in accordance with the print instruction.

6. The print control server according to claim 1, wherein the history acquirer is configured to count the print history for each of predetermined time periods, and
   the notifier is configured to notify the counted print history to the administrator.

7. The print control server according to claim 6, wherein the notifier is configured to notify the counted print history to the administrator in each of the predetermined time periods.

8. The print control server according to claim 6, wherein the notifier is configured to notify the counted print history to the administrator at a specified date and time.

9. The print control server according to claim 6, wherein when the notifier receives, via the chat system, a request to notify the counted print history, the notifier notifies the counted print history to the administrator.

10. The print control server according to claim 6, wherein when the notifier receives, via the chat system, an instruction to change time to notify the counted print history, the notifier changes, in accordance with the change instruction, the time to notify the counted print history to the administrator.

11. A print control method comprising:
   a print control step of acquiring a print instruction entered by a user belonging to a group chat in a chat system provided by a social networking service (SNS) and of causing a printer to execute printing in accordance with the print instruction;
   a history acquisition step of acquiring a print history, based on the print instruction, of the printer; and
   a notification step of notifying an administrator of the group chat about the print instruction entered by the user, the notifying of the administrator being in a chat form via the chat system at the time that the user entered the print instruction into the group chat, and the notifying of the administrator of the group chat about the print history in the chat form via the chat system being at a time after the notification to the administrator about the print instruction.

* * * * *